United States Patent [19]
Sakai et al.

[11] Patent Number: 5,724,115
[45] Date of Patent: Mar. 3, 1998

[54] LIQUID CRYSTAL DEVICE AND PROCESS FOR PREPARING THE SAME

[75] Inventors: Yukari Sakai; Mitsuko Nagai; Hideo Hama, all of Sodegaura, Japan

[73] Assignee: Mitsui Petrochemical Industries, Ltd., Tokyo, Japan

[21] Appl. No.: 459,801

[22] Filed: Jun. 2, 1995

[30] Foreign Application Priority Data

Jun. 13, 1994 [JP] Japan ................... 6-130696
Jan. 20, 1995 [JP] Japan ................... 7-007734

[51] Int. Cl.$^6$ ................ G02F 1/133; C09K 19/52
[52] U.S. Cl. ............... 349/134; 252/299.01; 349/84; 349/99; 349/171; 349/172; 349/174
[58] Field of Search ............... 252/299.01, 299.62; 349/84, 171, 99, 128, 134, 172, 174

[56] References Cited

U.S. PATENT DOCUMENTS

| | | | |
|---|---|---|---|
| 4,778,259 | 10/1988 | Kitayama et al. | 359/73 |
| 5,093,742 | 3/1992 | Okamoto et al. | 359/73 |
| 5,589,966 | 12/1996 | Hama et al. | 349/194 |

FOREIGN PATENT DOCUMENTS

| | | |
|---|---|---|
| 0549347 | 6/1993 | European Pat. Off. . |
| 4022888 | 2/1991 | Germany . |
| 04371925 | 12/1992 | Japan . |
| 06003676 | 1/1994 | Japan . |
| 2288672 | 10/1995 | United Kingdom . |

OTHER PUBLICATIONS

Patent Abstracts of Japan, vol. 18, No. 194, and JP-A-06-003676, Apr. 5, 1994.
Patent Abstracts of Japan, vol. 12, No. 125 and JP-A-62-250419, Oct. 31, 1987.

*Primary Examiner*—Shean C. Wu
*Attorney, Agent, or Firm*—Sherman and Shalloway

[57] ABSTRACT

Disclosed is a liquid crystal device comprising a liquid crystal cell filled with a liquid crystal material capable of exhibiting a smectic phase, said cell including upper and lower substrates each having in order an electrode and an orientation film in contact with the liquid crystal material, a cross angle Θ formed by the orientation treatment directions of the orientation films is 180°−δ or 360°−δ (0°<δ≦90°). Also disclosed is a process for preparing the above-mentioned liquid crystal device comprising treating the orientation films and preparing the liquid crystal cell so as to have the orientation treatment directions of the orientation films form the cross angle Θ within the above range in the cell. According to the present invention, a liquid crystal device having a high electrooptic response speed required in various technical fields such as optical communication, steroscopic image display, image processing and optical operation and also having a high optical contrast can be obtained.

6 Claims, 3 Drawing Sheets

Fig. 2-A-1
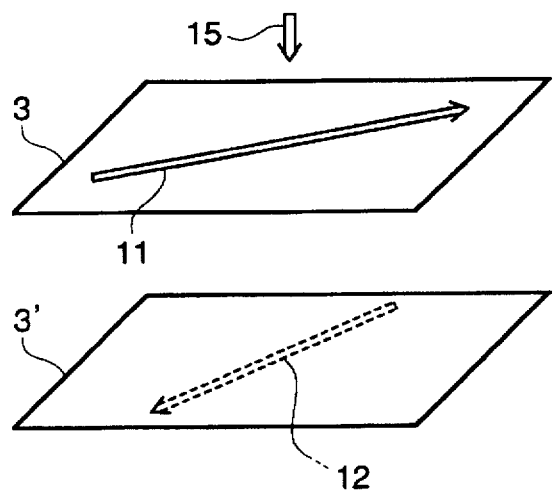
Fig. 2-A-2
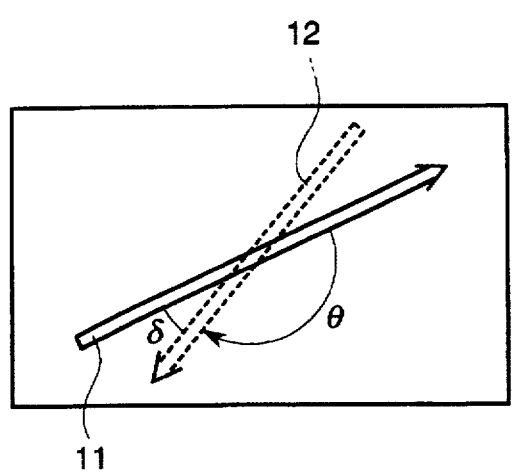
Fig. 2-B-1
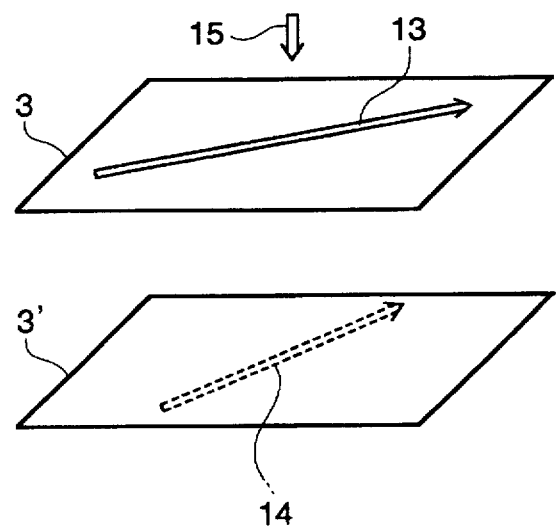
Fig. 2-B-2
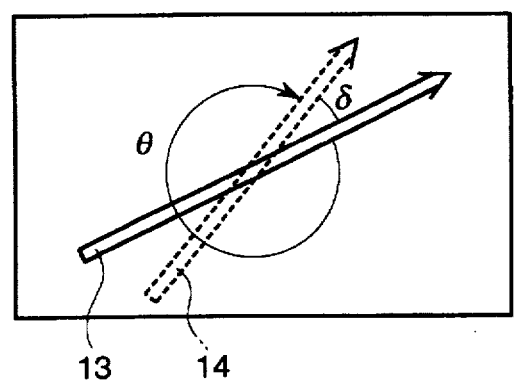

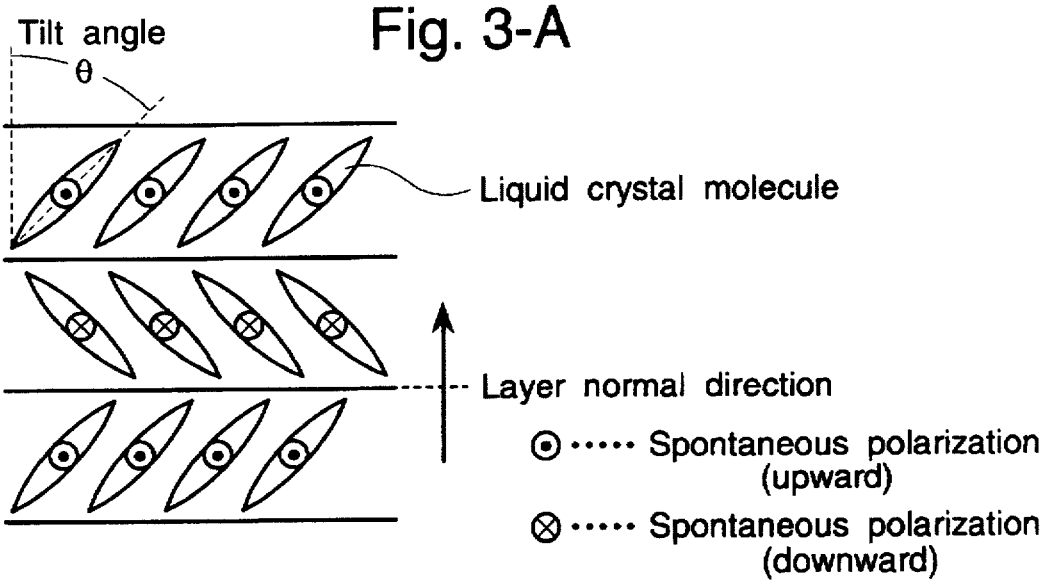
Fig. 3-A
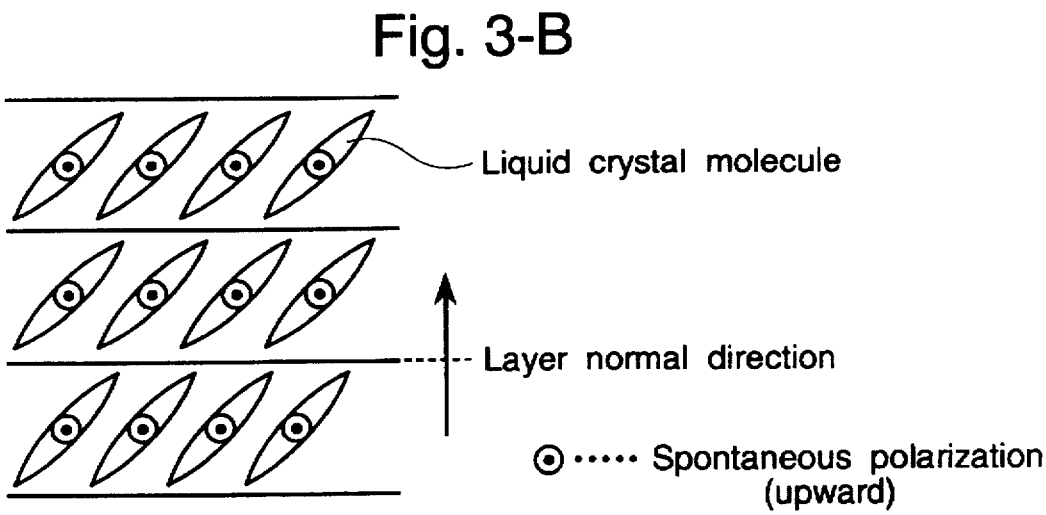
Fig. 3-B
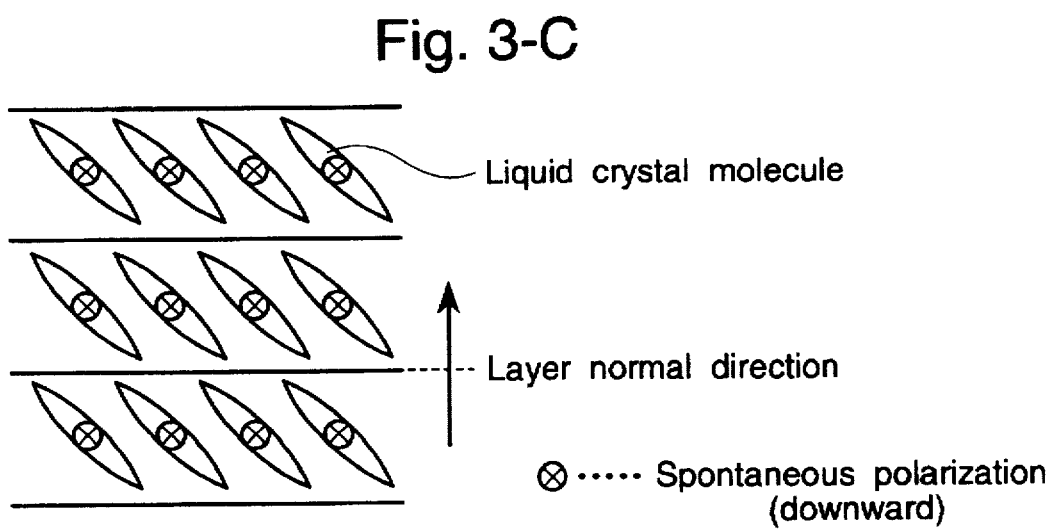
Fig. 3-C

LIQUID CRYSTAL DEVICE AND PROCESS FOR PREPARING THE SAME

FIELD OF THE INVENTION

The present invention relates to a liquid crystal device used for conducting optical modulation in various fields such as optical communication, stereoscopic image display, image processing, optical operation and plain image display, and to a process for preparing said device. More particularly, the invention relates to a liquid crystal device using electrooptic effect of the smectic liquid crystal phase and to a process for preparing said device.

BACKGROUND OF THE INVENTION

In order to lighten various optical modulation devices and display devices or to reduce power consumption required for these devices, a tendency of using liquid crystal devices for these devices has been recently increased. Of various liquid crystal devices, ferroelectric or antiferroelectric liquid crystal devices using electrooptic effect of a smectic liquid crystal phase (hereinafter referred to as "smectic liquid crystal device") have been paid attention because they have a wider view angle of field and a higher response speed as compared with TN liquid crystal devices. Particularly because the antiferroelectric crystal devices are excellent in impact resistance and almost free from a problem of printing a liquid crystal material on the inner surface of a liquid crystal cell, they have been recently paid much attention.

The smectic liquid crystal device includes a liquid crystal cell in which a liquid crystal material capable of exhibiting a smectic liquid crystal phase (hereinafter referred to as "smectic liquid crystal material") with a thickness of not more than several μm is filled between electrodes provided on a pair of substrates, and also includes, if necessary, various polarization control means. For conducting optical modulation with a sufficiently high contrast using the device, a layer of the smectic liquid crystal material in the liquid crystal cell is desired to be uniformly orientated so that the layer normal directions of the smectic liquid crystal (normal directions against the smectic liquid crystal layer) shown in FIGS. 3-A, 3-B and 3-C are almost the same as each other. In these figures, the liquid crystal molecules are orientated in such a manner that each liquid crystal molecule has a tilt angle θ, to form a liquid crystal layer. The layer normal shown in FIG. 3 is parallel with the electrode surface of the liquid crystal cell. In FIG. 3-A, a liquid crystal layer formed from liquid crystal molecules whose every spontaneous polarization is in the upward direction and a liquid crystal layer formed from liquid crystal molecules whose every spontaneous polarization is in the downward direction are layered one upon another. In FIG. 3-B, liquid crystal layers each formed from liquid crystal molecules whose every spontaneous polarization is in the upward direction are layered one upon another. In FIG. 3-C, liquid crystal layers each formed from liquid crystal molecules whose every spontaneous polarization is in the downward direction are laminated one upon another.

Particularly in the case of optical switches for optical communication, optical shutters for stereoscopic image display and spatial optical modulators used for image display, image processing and optical operation, a contrast of at least about 100 is necessary, so that it is required that not only the smectic liquid crystal layer is uniformly orientated all over the device surface but also occurrence of various defects in the smectic liquid crystal layer is inhibited.

For making the layer normal directions of the smectic liquid crystal the same as each other, there is conventionally known a method of first forming an orientation film made of a polymer thin film such as a polyimide thin film on the interface between the substrate and the liquid crystal material and then subjecting the orientation film surface which is to be brought into contact with the liquid crystal material to a rubbing treatment. The term "rubbing treatment" used herein means a treatment of rubbing the surface of the orientation film formed on the substrate in a given direction with a cloth or the like.

When the liquid crystal material is filled between the orientation films whose rubbing directions are parallel with each other, however, plural domains having layer normal directions of the smectic liquid crystal different from those of their adjacent domains are often formed. Especially in the case where the layer normal directions of the smectic liquid crystal are strikingly different with domains, if electric voltage is applied to the liquid crystal cell to change the orientation state of the smectic liquid crystal layer inside the liquid crystal cell, light leaking takes place because the extinction positions of the smectic liquid crystal layer differ with domains. Therefore, the liquid crystal device provided with such a liquid crystal cell as mentioned above has a problem that the contrast between brightness and darkness of the output lights before and after optical modulation is conducted by this liquid crystal device becomes smaller as compared with the case of using a liquid crystal device in which the layer normal directions of the smectic liquid crystal present inside the liquid crystal cell are the same as each other. That is, a sufficiently high contrast cannot be obtained by the use of a ferroelectric or antiferroelectric liquid crystal device provided with a liquid crystal cell in which a liquid crystal material is filled between such orientation films as have rubbing directions parallel with each other.

For solving this problem, particularly in the antiferroelectric liquid crystal device, there have been proposed methods of shifting the rubbing direction against the orientation film formed on each of the upper and lower substrates. For example, Japanese Patent Laid-Open Publication No. 371925/1992 proposes a method of shifting the rubbing direction by the sum $(\theta_1+\theta_2)$ of the angle $\theta_1$ which is formed by the rubbing direction and the layer normal of the liquid crystal in a smectic A phase on the surface of the orientation film provided on the upper substrate and the angle $\theta_2$ which is formed by the rubbing direction and the layer normal of the liquid crystal in a smectic A phase on the surface of the orientation film provided on the lower substrate. Japanese Patent Laid-Open Publication No. 3676/1994 proposes a method of shifting the rubbing direction by a given angle.

However, the method proposed in Japanese Patent Laid-Open Publication No. 371925/1992 is not applicable because the angle between the rubbing directions on the surfaces of the orientation films formed on the upper and lower substrates cannot be determined in the case of a liquid crystal material whose layer normal against the rubbing direction is not decided univocally or a liquid crystal material which cannot be in a smectic A phase.

Also in the method proposed in Japanese Patent Laid-Open Publication No. 3676/1994, there is a problem that the preferred range of the angle to obtain sufficiently uniform orientation is not always clear.

In the above-mentioned conventional methods, moreover, stripe defects induced by application of an electric field cannot be inhibited, and hence when switching between the ferroelectric states, which is brought about by applying electric voltage to the antiferroelectric liquid crystal device, is used for the optical modulation, a sufficiently high contrast can be hardly obtained only by shifting the rubbing direction of the surface of the orientation film formed on each of the upper and lower substrates by application of an electric field.

OBJECT OF THE INVENTION

The present invention is intended to solve such problems associated with the prior art as mentioned above, and it is an object of the invention to provide a liquid crystal device which can conduct optical modulation with a high contrast using electrooptic effect of the smectic liquid crystal phase and to provide a process for preparing said device.

It is another object of the invention to provide a liquid crystal device which can inhibit stripe defects occurring in the course of driving the liquid crystal device thereby to conduct optical modulation with keeping the state of high contrast and to provide a process for preparing said device.

SUMMARY OF THE INVENTION

The liquid crystal device according to the present invention is a liquid crystal device (element) comprising a liquid crystal cell filled with a liquid crystal material capable of exhibiting a smectic phase, said cell including upper and lower substrates each having in order an electrode and an orientation film on the surface of the electrode, in which the surface of each orientation film is treated by subjecting the film to an orientation treatment to control an orientation direction of a liquid crystal material in contact therewith, the orientation treatment direction of one orientation film is different from the orientation treatment direction of the other orientation film, and the cross angle formed by these orientation treatment direction films, as measured in the clockwise direction based on the orientation treatment direction of the orientation film of the upper substrate side, is represented by the following formula [I] or [II]:

$$\theta = 180° - \delta \quad [I]$$

$$\theta = 360° - \delta \quad [II]$$

wherein $0° < \delta \leq 90°$.

In this liquid crystal device, it is preferred that:

(a) when the liquid crystal cell filled with the liquid crystal material in a smectic phase is placed between two polarizing plates of the crossed Nicols arrangement in such a manner that the amount of the transmitted light, which transmits through one polarizing plate, the liquid crystal cell and the other polarizing plate in this order, would be minimum, the minimum value T of the light transmittance represented by the following formula [IV] is not more than 1.0%;

$$T = |(I - I_0)/I_{100}| \times 100 \quad [IV]$$

wherein I is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed;

(b) when the liquid crystal cell filled with the liquid crystal material in a smectic phase is placed between two polarizing plates of the crossed Nicols arrangement in such a manner that the amount of the transmitted light, which transmits through one polarizing plate, the liquid crystal cell and the other polarizing plate in this order with applying electric voltage between the electrodes of the liquid crystal cell to vary the optical axis of the cell, would be minimum, the minimum value T' of the light transmittance represented by the following formula [V] is not more than 1.0%;

$$T' = |(I' - I_0)/I_{100}| \times 100 \quad [V]$$

wherein I' is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed; or (c) when the liquid crystal cell filled with the liquid crystal material in a smectic phase is placed between two polarizing plates of the crossed Nicols arrangement in such a manner that the amount of the transmitted light, which transmits through one polarizing plate, the liquid crystal cell and the other polarizing plate in this order after alternating voltage is applied between the electrodes of the liquid crystal cell to drive the cell and application of the voltage is stopped, would be minimum, the minimum value T" of the light transmittance represented by the following formula [VI] is not more than 1.0%;

$$T'' = |(I'' - I_0)/I_{100}| \times 100 \quad [VI]$$

wherein I" is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

The process for preparing a liquid crystal device according to the present invention is a process for preparing a liquid crystal device having a liquid crystal cell filled with a liquid crystal material capable of exhibiting a smectic phase, said cell including upper and lower substrates each having in order an electrode and an orientation film in contact with the liquid crystal material, which comprises a step of treating the surface of each orientation film by subjecting the film to an orientation treatment to control an orientation direction of a liquid crystal material in contact therewith, said orientation treatment being conducted in such a manner that the cross angle formed by the orientation treatment direction of one orientation film and the orientation treatment direction of the other orientation film in the cell, as measured in the clockwise direction based on the orientation treatment direction of the orientation film of the upper substrate side, would be an angle represented by the following formula [I] or [II]:

$$\theta = 180° - \delta \quad [I]$$

$$\theta = 360° - \delta \quad [II]$$

wherein $0° < \delta \leq 90°$.

In the process for preparing a liquid crystal device according to the invention, it is preferred that:

the liquid crystal material in an isotropic phase is cooled to conduct phase transition of from the isotropic phase to a smectic phase while electric voltage larger in the absolute value than that required for varying the optical axis of the liquid crystal material when the liquid crystal material is in a smectic phase is applied between the electrodes of the liquid crystal cell; or electric voltage larger in the absolute value than that required for varying an optical axis of the liquid crystal material when the liquid crystal material is in a smectic phase is applied between the electrodes of the liquid crystal cell.

BRIEF DESCRIPTION OF THE DRAWING

FIGS. 2-A-1, 2-A-2, 2-B-1 and 2-B-2 each schematically illustrates rubbing directions of the orientation films in the liquid crystal device shown in FIG. 1.

FIGS. 3-A, 3-B and 3-C illustrate various orientation states of the liquid crystal material in a smectic phase filled inside the smectic liquid crystal cell of the liquid crystal device according to the present invention.

DETAILED DESCRIPTION OF THE INVENTION

[Liquid Crystal Device]

Figure 1:
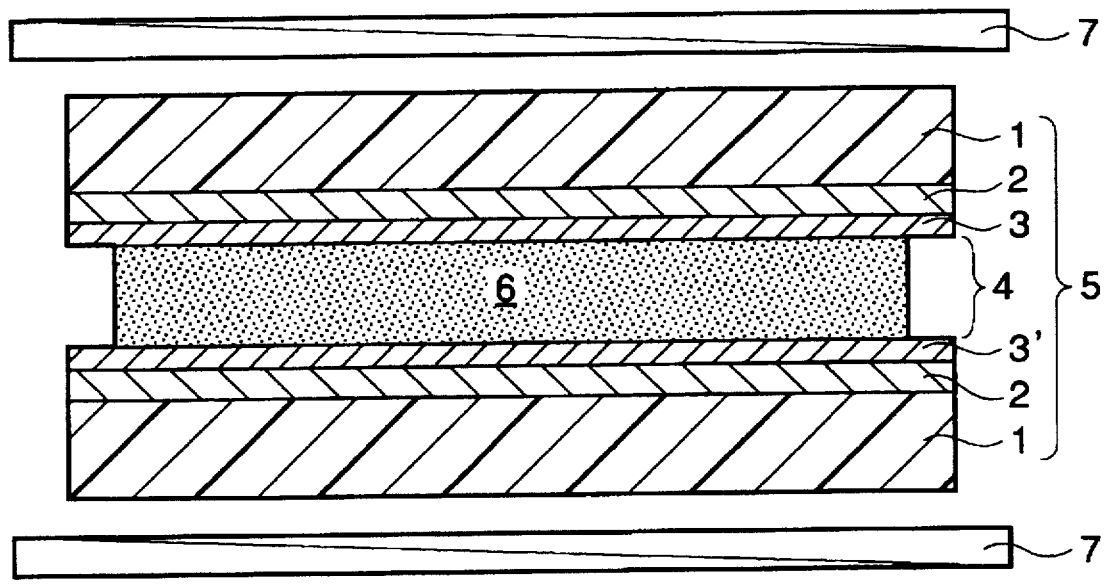
FIG. 1 schematically illustrates one example of the liquid crystal devices according to the present invention.

First, the liquid crystal device according to the invention is described with reference to the attached drawings.

FIG. 1 shows one example of the liquid crystal device according to the invention.

The liquid crystal device 10 comprises a liquid crystal cell 5 which has a pair of substrates 1,1, electrodes 2,2 formed on the surfaces of both substrates 1,1, an orientation film 3 formed on one electrode 2, an orientation film 3' formed on the other electrode 2, and in the cell 5 a liquid crystal material 6 is filled in a gap 4 between the orientation films 3,3'.

The substrate 1 is, for example, a transparent glass plate, a transparent plastic plate or a transparent plastic film. Examples of the transparent glasses include soda-lime glass, borosilicate glass, non-alkali glass and quartz. Examples of the transparent plastics include polyolefin, polyester and polystyrene. When other glass plate than a quartz plate, the transparent plastic plate or the transparent plastic film is used as the substrate 1, it is preferred to preliminarily form an undercoat (not shown) such as a $SiO_2$ film on the substrate 1 by means of dip coating, deposition or sputtering and then forming thereon the electrode 2, to prevent elution of impurities contained in the substrate 1, such as metallic ion and stabilizer, into the liquid crystal material 6.

In the liquid crystal device 10, a conductive film which is transparent to (transmits) such a light of wavelength as is modulated by the liquid crystal device 10 is used as each of the electrodes 2,2. Examples of such conductive films include an indium tin-oxide conductive film (known as "ITO") and a zinc oxide conductive film. The conductive film is formed on the substrate 1 by means of, for example, dip coating, CVD method, sputtering, ion plating or vacuum deposition.

In the present invention, it is enough that at least one of the electrodes 2,2 is transparent to such a light of wavelength as is modulated by the liquid crystal device 10. When one electrode 2 is transparent to such a light of wavelength as is modulated by the liquid crystal device 10, the other electrode 2 can be selected from electrodes of various types according to the use application of the liquid crystal device 10. For example, the above-mentioned transparent electrode or an electrode obtained by forming a photoconductive layer such as a layer of amorphous silicon or CdSe on the transparent electrode can be employed. In he latter case, when electric voltage is applied between the transparent electrodes, the intensity of electric field formed in the liquid crystal material between the orientation films 3,3' varies according to the intensity of the light with which the photoconductive layer is irradiated. Utilizing the characteristics, for example, the polarization state of the reflected light of a light which enters from the side of the substrate having only a transparent electrode can be controlled.

Further, on one or both of the electrodes 2,2, an insulating film, such as a film of $SiO_2$, having a thickness of 100 to 1,000 Å may be formed by means of, for example, vacuum deposition or sputtering, to prevent short circuit.

The orientation films 3,3' may be the same as or different from each other, and they are formed from thin films of polymers such as polyimide and polyvinyl alcohol, preferably polyimide. The polymer thin film preferably having a thickness of 50 to 3,000 Å is formed as the orientation film 3 or 3' on the electrode 2 or on an insulating film such as a $SiO_2$ film when such insulating film is provided on the electrode 2, by means of printing, spin coating, deposition polymerization, dip coating or the like. Especially when the orientation films 3,3' are polyimide thin films, the liquid crystal device 10 can be stably driven for a long period of time.

In the liquid crystal cell 5, the surfaces, in contact with the liquid crystal material 6, of the orientation films 3,3' are subjected to orientation treatment, for example, by rubbing the surfaces of the orientation films 3,3', i.e. a rubbing treatment, with a raised cloth such as nylon, silk or rayon in one direction. This orientation treatment is conducted in such a manner that the cross angle formed by the orientation treatment direction of a liquid crystal material of one orientation film 3 in contact with the liquid crystal material 6 and the orientation treatment direction of the other orientation film 3' in contact with the liquid crystal material 6, as measured in the clockwise direction based on the orientation treatment direction of the orientation film of the upper substrate side, i.e., light outgoing side of the liquid crystal cell including upper and lower substrates, would be an angle represented by the following formula [I] or [II]:

$$\theta = 180° - \delta \quad [I]$$

$$\theta = 360° - \delta \quad [II]$$

wherein $0° < \delta \leq 90°$, as shown in FIGS. 2-A-1, 2-A-2, 2-B-1 and 2-B-2.

In the liquid crystal cell 5 of the liquid crystal device 10 shown in FIG. 1, a liquid crystal material capable of exhibiting a smectic phase is filled as the liquid crystal material 6 between the orientation films 3,3' which orientation films having been subjected to the orientation treatment form the above cross angle θ.

In the liquid crystal device 10, the orientation directions are controlled by the orientation films 3,3' in the above-mentioned manner and the liquid crystal cell 5 filled with a liquid crystal material capable of exhibiting a smectic phase as the liquid crystal material 6 is provided. Hence, optical modulation can be carried out with a higher contrast at a higher response speed utilizing the electrooptic change of the smectic phase. The contrast of the liquid crystal device 10 can be further improved when δ is preferably not less than 2°, more preferably not less than 3°, particularly preferably not less than 5°, and is preferably not more than 40°, more preferably not more than 35°.

In the liquid crystal cell 5, the liquid crystal material 6 is filled in a gap 4 between the orientation films 3,3' as described above. This gap 4 is generally formed by bonding a pair of substrates 1,1 together interposing a spacer (not shown) between the orientation films 3,3'.

As the spacer, there can be used a resin film from which the liquid crystal filling portion and the inlet portion have been cut off and which has a thickness corresponding to the desired distance of the gap 4. Also employable are a spherical spacer having a diameter almost equal to the desired distance of the gap 4 (e.g., spherical alumina spacer, spherical silica spacer, spherical resin spacer) and a column-like spacer (e.g., glass rod spacer).

When the resin film is used as the spacer, an adhesive layer is provided between each of the substrates 1, 1 and the spacer, and the adhesive layer is cured to bond each of the substrates 1, 1 and the spacer together. When the spherical spacer is used, the spacer is scattered on one substrate 1, then the other substrate 1 is superposed thereon, and both the substrates 1,1 are bonded together with an adhesive. When a column-like spacer is used, an adhesive is mixed with the spacer, the resulting mixture is applied to one substrate 1, and this substrate 1 and the other substrate 1 are bonded together with the mixture. The distance of the gap 4 thus formed, i.e., thickness of the liquid crystal material 6 filled inside the liquid crystal cell 5, is preferably adjusted to an optimum value determined by the wavelength of a light to be modulated by the liquid crystal device 10, birefringence index of the liquid crystal material 6 and entering and outgoing methods of the light. For example, when the light to be modulated by the liquid crystal cell 10 is a visible light and the light is incident on the liquid crystal device from the side of one substrate 1 of the liquid crystal cell 5 and then transmits through the liquid crystal cell 5 so as to modulate the light by the liquid crystal device 10 without using any phase plate, the thickness of the liquid crystal material filled inside the liquid crystal cell 5 is preferably in the range of 1.5 to 3 μm.

The liquid crystal material 6 filled inside the liquid crystal cell 5 may be a single compound or may be a composition of plural compounds, as far as it exhibits a smectic phase within the working temperature range of the liquid crystal device 10.

In the present invention, a liquid crystal material capable of exhibiting a smectic phase, preferably a chiral smectic phase, is used as the liquid crystal material 6. There is no specific limitation on the liquid crystal material 6 as far as it exhibits a smectic phase within the working temperature range of the liquid crystal device 10. However, preferably used is a liquid crystal material showing antiferroelectricity because it has high impact resistance and is almost free from printing a liquid crystal material on the inner surface of a liquid crystal cell. On the point that the working temperature range of the liquid crystal device 10 can be widened and the working properties such as an electrooptical contrast of the liquid crystal device 10 can be improved, the liquid crystal material 6 particularly preferably contains a compound represented by the following formula [III]:

$$R'-(A-X)_p-(B-Y)_q-(C-Z)_r-R^* \quad [III]$$

wherein R' is a group of 3 to 20 carbon atoms selected from an alkyl group, an alkoxy group, a halogenated alkyl group and a halogenated alkoxy group;

A, B and C are each independently a group selected from the following groups

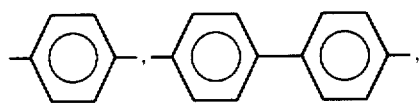

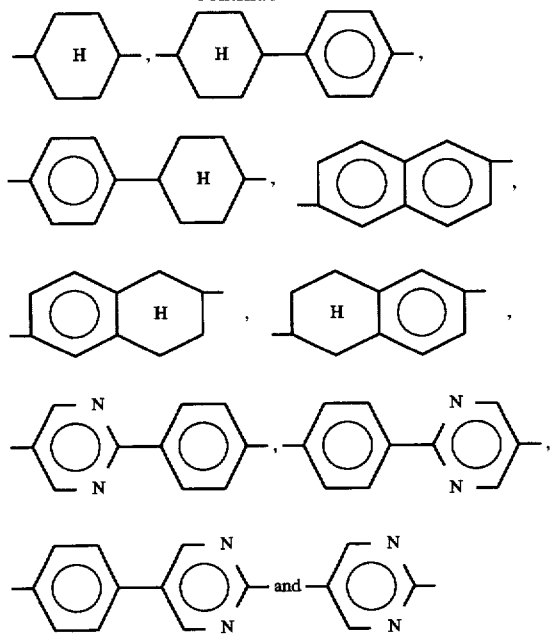

whose hydrogen atoms may be wholly or partly replaced with an atom or a group selected from a halogen atom, a methyl group, an ethyl group, a methoxy group, an ethoxy group, a hydroxyl group, a trifluoromethyl group, a difluoromethyl group and a monofluoromethyl group, and at least one of A, B and C is the following group:

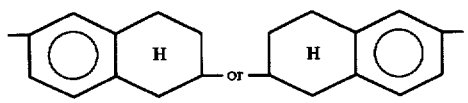

whose hydrogen atoms may be wholly or partly replaced with an atom or a group selected from a halogen atom, a methyl group, an ethyl group, a methoxy group, an ethoxy group, a hydroxyl group, a trifluoromethyl group, a difluoromethyl group and a monofluoromethyl group;

X, Y and Z are each independently a divalent group selected from —COO—, —OCO—, —CH$_2$CH$_2$—, —CH$_2$O—, —OCH$_2$—, —S—S—, —CO—CH$_2$— and —CH$_2$—CO—;

R* is an optically active group of 4 to 20 carbon atoms having at least one asymmetric carbon atom, hydrogen atoms bonded to the carbon atoms in said group may be wholly or partly replaced with a halogen atom, and said group may contain at least one atom selected from a silicon atom, an oxygen atom and a sulfur atom as a bond group; and p, q and r are each independently 0 or 1, and at least one of p, q and r is 1.

Listed below are examples of the compounds represented by the above formula [III].

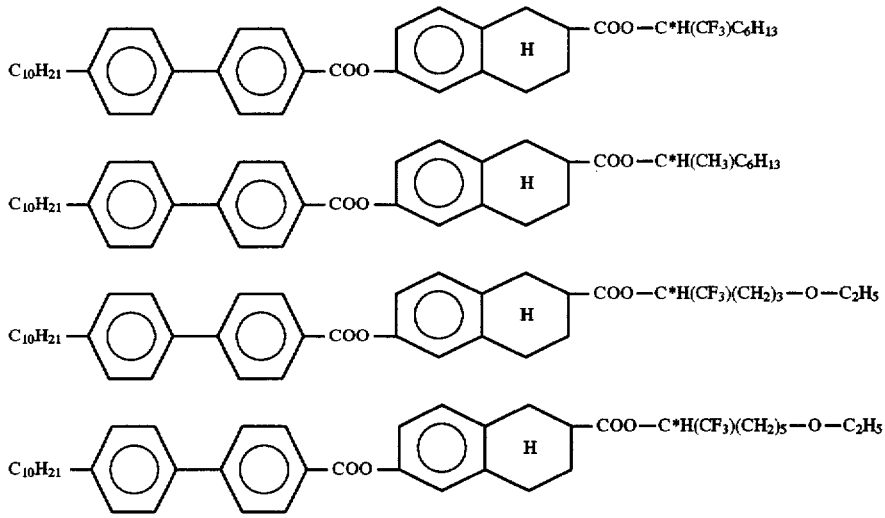

In the liquid crystal device 10 shown in FIG. 1, polarizing plates 7,7 are arranged on both sides of the liquid crystal cell 5 filled with the liquid crystal material 6 so that the light transmits through one polarizing plate 7, the liquid crystal cell 5 and the other polarizing plate 7 in this order.

In the liquid crystal device 10, one liquid crystal cell 5 is placed between two polarizing plates 7,7, but in the liquid crystal device according to the invention, plural liquid crystal cells 5 may be placed in parallel with each other, if necessary, so that the light transmits through the plural cells. For example, when a given polarized light released from the light source is incident on the liquid crystal cell 5, or when the observer observes the outgoing light from the liquid crystal device 10 with polarizing eyeglasses, one of the two polarizing plates 7,7 may be omitted. When a given polarized light released from the light source is incident on the liquid crystal cell 5 and the observer observes the outgoing light from the liquid crystal device 10 with polarizing eyeglasses, the liquid crystal device may be composed of only the liquid crystal cell 5.

As described above, various changes and modifications of the liquid crystal device according the invention are possible within the scope of the patent claims.

In any case, in the liquid crystal device of the invention, it is preferred that:

(a) the liquid crystal cell 5 filled with the liquid crystal material 6 in a smectic phase is placed between the two polarizing plates 7,7 of the crossed Nicols arrangement in such a manner that the amount of the transmitted light, which transmits through one polarizing plate 7, the liquid crystal cell 5 and the other polarizing plate 7 in this order, would be minimum;

(b) the liquid crystal cell 5 filled with the liquid crystal material 6 in a smectic phase is placed between the two polarizing plates 7,7 of the crossed Nicols arrangement in such a manner that the amount of the transmitted light, which transmits through one polarizing plate 7, the liquid crystal cell 5 and the other polarizing plate 7 in this order with applying electric voltage between the electrodes 2,2 of the liquid crystal cell 5 to vary the optical axis of the cell 5, would be minimum; or (c) the liquid crystal cell 5 filled with the liquid crystal material 6 in a smectic phase is placed between the two polarizing plates 7,7 of the crossed Nicols arrangement in such a manner that the amount of the transmitted light, which transmits through one polarizing plate 7, the liquid crystal cell 5 and the other polarizing plate 7 in this order, as measured after alternating voltage is applied between the electrodes of the liquid crystal cell 5 to drive the cell 5 and application of the voltage is stopped, would be minimum.

When the liquid crystal material 6 is in a smectic phase, the liquid crystal material 6 shows birefringence, and the polarization direction of the extraordinary light in this case is an optical axis of the liquid crystal material 6.

In the above case (a), it is desired that the minimum value T of the light transmittance represented by the following formula [IV] is not more than 1.0%, preferably not more than 0.8%, particularly preferably not more than 0.5%:

$$T = |(I - I_0)/I_{100}| \times 100 \qquad [IV]$$

wherein I is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

In the above case (b), it is desired that the minimum value T' of the light transmittance represented by the following formula [V] is not more than 1.0%, preferably not more than 0.8%, particularly preferably not more than 0.5%:

$$T' = |(I' - I_0)/I_{100}| \times 100 \qquad [V]$$

wherein I' is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

In the above case (c), it is desired that the minimum value T" of the light transmittance represented by the following formula [VI] is not more than 1.0%, preferably not more than 0.8%, particularly preferably not more than 0.5%:

$$T'' = |(I'' - I_0)/I_{100}| \times 100 \qquad [VI]$$

wherein I" is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

The liquid crystal device having the minimum value T or T' of the light transmittance of not more than 1.0 is suitably used as a liquid crystal device for optical modulation such as an optical shutter, and the liquid crystal device having the minimum value T" of the light transmittance of not more than 1.0 is suitably used as a liquid crystal device for display.

In the liquid crystal device 10 shown in FIG. 1, two polarizing plates 7 are arranged in the crossed Nicols state or in the parallel Nicols state. The liquid crystal device 10 in which two polarizing plates 7 are arranged as above and a smectic liquid crystal material showing antiferroelectricity is filled in the liquid crystal cell 5 as the liquid crystal material 6 can be applied to various uses utilizing the antiferroelectricity. For example, it can be used as an optical shutter having a wide view angle of field and a high response speed in the field of stereoscopic image display. When a smectic liquid crystal material showing antiferroelectricity and having a tilt angle of 22.5 degrees or thereabout is used as the liquid crystal material 6 and the liquid crystal cell 5 is placed in such a manner that the angle formed by the layer normal direction of the smectic liquid crystal inside the liquid crystal cell 5 and the transmission axis of the polarizing plate 7 on the incidence side would be 22.5 degrees, a liquid crystal device having any one of the minimum values T, T' and T" of not more than 1.0% can be obtained.

Further, if any one of the minimum values T, T' and T" of the light transmittance is made not more than 1.0%, a liquid crystal device having an optical contrast of not less than 100 can be obtained. Therefore, the liquid crystal device having any one of the minimum values T, T' and T" of not more than 1.0% can be suitably used in various fields where a contrast of at least about 100 is required, such as fields of optical communication, stereoscopic image display, image processing and optical operation.

In contrast therewith, in the conventional liquid crystal devices, any of the minimum values T, T' and T" of the light transmittance cannot be kept at a level of not more than 1.0%, as shown in the examples described later, and the minimum value of the light transmittance exceeds 1.0% while the liquid crystal device is used. Therefore, the optical contrast of such liquid crystal device can be hardly kept at not less than 100.

[Process for Preparing Liquid Crystal Device]

Next, the process for preparing a liquid crystal device according to the invention is described in detail.

Referring to FIGS. 1, 2-A-1, 2-A-2, 2-B-1 and 2-B-2, when a liquid crystal device comprising a liquid crystal cell filled with a liquid crystal material capable of exhibiting a smectic phase, said cell including upper and lower substrates each having in order an electrode and an orientation film on the electrode side surface is prepared in the process of the invention, the surfaces of the orientation films 3,3' are treated by subjecting the orientation film to orientation treatment to control orientation directions of a liquid crystal material 6 in contact therewith in the cell 5, the orientation treatment is conducted in such a manner that the cross angle formed by the orientation treatment direction of one orientation film 3 and the orientation treatment direction of the other orientation film 3', as measured in the clockwise direction based on the orientation treatment direction of the orientation film of the upper substrate side, would be an angle represented by the following formula [I] or [II]:

$$\theta = 180° - \delta \quad \text{[I]}$$

$$\theta = 360° - \delta \quad \text{[II]}$$

wherein $0° < \delta \leq 90°$.

As described hereinbefore, it is desired that δ is preferably not less than 2°, more preferably not less than 3°, particularly preferably not less than 5°, and is preferably not more than 40°, more preferably not more than 35°.

The liquid crystal device 10 which is controlled in the orientation directions by the orientation films 3,3' and is provided with the liquid crystal cell 5 filled with a liquid crystal material capable of exhibiting a smectic phase as the liquid crystal material 6 as described above can conduct optical modulation with a high contrast at a high speed utilizing the electrooptic change of the smectic phase.

That is, the process of the invention can prepare a liquid crystal device capable of conducting optical modulation with a high contrast at a high speed.

According to the process of the invention, further, the above-mentioned cross angle does not always need to be adjusted to a fixed angle (e.g., 6.8°) on the basis of the layer normal direction of the smectic liquid crystal present inside the liquid crystal cell, differently from the conventional processes, and the cross angle can be adjusted within the range of about 90° shown in the formula [I] or [II]. Therefore, even if the layer normal direction (i.e., basis of the above-mentioned angle) is not decided univocally, optical modulation can be carried out with a high contrast at a high speed.

The liquid crystal cell provided with two orientation films which control orientation directions of a liquid crystal material in contact with the orientation films so as to have the orientation treatment directions of the orientation films intersect at an angle of the above-mentioned range can be obtained by (i) initially forming orientation films on the surfaces of electrodes provided on a pair of substrates for a liquid crystal cell, and (ii) then subjecting the surfaces of the orientation films to an orientation treatment in such a manner that the orientation treatment directions of the orientation films intersect at an angle Θ represented by the formula (I) or (II), followed by arranging a pair of the substrates for a liquid crystal cell thus treated and having the orientation films face each other.

In this process, the cross angle is determined by the orientation directions controlled by the orientation films and the arrangement of a pair of the substrates each having an electrode and the orientation film adhered thereto for a liquid crystal cell.

Preferred embodiments of the process for preparing a liquid crystal device according to the invention are described below with reference to FIG. 1.

In this invention, preferably used is a process in which the liquid crystal material 6 in an isotropic phase is cooled to conduct phase transition of from the isotropic phase to a smectic phase while electric voltage larger in the absolute value than that required for saturating the variation of the optical axis of the liquid crystal material 6 when the liquid crystal material 6 filled in the liquid crystal cell 5 is in a smectic phase is applied between the electrodes of the liquid crystal cell 5 (hereinafter referred to as "the first process" of the invention).

Also preferably used is a process in which electric voltage larger in the absolute value than that required for saturating the variation of the optical axis of the liquid crystal material 6 when the liquid crystal material 6 filled in the liquid crystal cell 5 is in a smectic phase, preferably electric voltage of not less than 1.3 times, particularly preferably not less than 2 times, in the absolute value, as much as the abovementioned voltage, is applied between the electrodes of the liquid crystal cell 5 (hereinafter referred to as "the second process" of the invention).

In any of the first process and the second process, a liquid crystal device having at least one of the minimum values T, T' and T" of the light transmittance of not more than 1.0% can be prepared, even if any orientation film is not formed on the electrodes.

Further, in the liquid crystal device prepared by the first process or the second process, stripe defects occurring in the driving procedure of the liquid crystal device can be inhibited, and a high contrast of not less than 100 can be kept for a long period of time because at least one of the minimum values T, T' and T" of the light transmittance is not more than 1.0%. On the other hand, when a liquid crystal device is prepared by other process than the above, stripe defects take place while the resulting device is driven, or each of the minimum values T, T' and T" of the light transmittance exceeds 1.0%. Therefore, it is difficult to provide even an liquid crystal device having an initial contrast of not less than 100.

In the case of the second process for preparing a liquid crystal device, when electric voltage of not less than 2 times in the absolute value as much as that required for saturating the variation of the optical axis of the liquid crystal material 6 when the liquid crystal material 6 filled in the liquid crystal cell 5 is in a smectic phase is applied between the electrodes of the liquid crystal cell 5, a liquid crystal device having at least one of the minimum values T, T' and T" of not more than 1.0% can be prepared only by applying electric voltage between the electrodes of the liquid crystal cell for about several minutes. However, where the absolute value of the voltage applied between the electrodes of the liquid crystal cell is larger than the absolute value of the voltage required for saturating the variation of the optical axis when the liquid crystal material 6 filled in the liquid crystal cell 5 is in a smectic phase, even if a difference between both voltages is small, a liquid crystal device having at least one of the minimum values T, T' and T" of not more than 1.0% can be prepared by prolonging the time for applying the voltage between the electrodes of the liquid crystal cell.

In any of the first process and the second process for preparing a liquid crystal material according to the invention, it is preferred to alternately change the polarities of the voltage to prevent an adverse phenomenon such as printing of the liquid crystal material filled in the liquid crystal cell caused by the direct current of the voltage.

Even in the liquid crystal device prepared by the first process of the invention, at least one of the minimum values T, T' and T" of the light transmittance sometimes increases while the device is driven, or stripe defects might take place. However, when electric voltage larger in the absolute value than that required for saturating the variation of the optical axis when the liquid crystal material 6 filled in the liquid crystal cell 5 is in a smectic phase is applied between the electrodes 2.2 of the liquid crystal cell 5 before at least one of the minimum values T, T' and T" of the light transmittance, e.g., T, exceeds 1.0%, the minimum value T of the light transmittance can be kept at a level of not more than 1.0%.

Also even in the case where the liquid crystal device prepared by the first process of the invention is driven for a long period of time so that at least one of the minimum values T, T' and T" of the light transmittance, e.g., T', exceeds 1.0%, if electric voltage larger in the absolute value than that required for saturating the variation of the optical axis when the liquid crystal material 6 filled in the liquid crystal cell 5 is in a smectic phase is applied between the electrodes of the liquid crystal cell 5, the minimum value T' of the light transmittance can be returned to not more than 1.0%.

The process for preparing a liquid crystal device according to the invention also includes such a case that the first process and the second process are combined to prepare a liquid crystal device having at least one of the minimum values T, T' and T" of the light transmittance of not more than 1.0%.

Even the liquid crystal device prepared by the process of the invention sometimes suffers stripe defects in the driving procedure of the device, after the device is allowed to stand for a long period of time. However, if the above-mentioned first or second process is applied to the liquid crystal cell 5 of the liquid crystal device suffering the stripe defects, those stripe defects are completely or almost completely removed and a liquid crystal device having a contrast of not less than 100 can be obtained.

In the case of the liquid crystal device prepared by the first process or the second process, particularly in the liquid crystal device prepared by the second process, it is preferred that the polarities of the electric voltage applied between the electrodes of the liquid crystal cell are changed alternately, for example, by applying alternating current between the electrodes of the liquid crystal cell, in order to keep at least one of the minimum values T, T' and T" of the light transmittance at a level of not more than 1.0% for a long period of time.

By the use of such processes as mentioned above, stripe defects caused by applying electric voltage between the electrodes of the liquid crystal cell particularly in the antiferroelectric liquid crystal device can be inhibited. Accordingly, the above processes are preferably applied to all the liquid crystal devices for conducting optical modulation utilizing antiferroelectricity of the antiferroelectric liquid crystal material and the liquid crystal devices for conducting optical modulation utilizing switching between the ferroelectric states.

EFFECT OF THE INVENTION

According to the present invention, a liquid crystal device which has a high electrooptic response speed required in various technical fields such as optical communication, stereoscopic image display, image processing and optical operation and also has a high optical contrast can be obtained more easily and surely as compared with the conventional processes.

In the process of the invention, the liquid crystal material in an isotropic phase is cooled to conduct phase transition of from the isotropic phase to a smectic phase while electric voltage larger in the absolute value than that required for saturating the variation of the optical axis when the liquid crystal material is in a smectic phase is applied between the electrodes of the liquid crystal cell, or electric voltage larger in the absolute value than that required for saturating the variation of the optical axis when the liquid crystal material is in a smectic phase is applied between the electrodes of the liquid crystal cell. As a result, a liquid crystal device which is restrained from stripe defects occurring in the driving procedure of the device thereby to conduct optical modulation with keeping a high contrast can be obtained.

The present invention will be further described with reference to the following examples, but it should be construed that the invention is in no way limited to those example.

EXAMPLE

Example 1

[Process 1 for Preparing Cell]

On each of two soda-lime glass substrates 1.1 mm thick having been abraded on the surface and provided with an undercoat of $SiO_2$ thin film, an ITO transparent electrode of 800 Å in thickness was formed, and thereto was applied commercially available polyimide by means of spin coating in such a manner that the resulting polyimide film would have a thickness of 300 Å, followed by heating at 180° C. for 1 hour.

Then, the surface of the polyimide film on each substrate was rubbed in a given direction with nylon cloth.

The polyimide film side surface of one substrate was coated with an ethanol suspension of spherical silica spacer having a mean particle diameter of 2.0 μm by means of spin coating, and was heated at 110° C. for 1 hour to evaporate ethanol so as to make the spherical silica in the scattered state. Thereafter, this substrate and the other substrate were placed one upon another to make the rubbing directions of the polyimide films on the upper and lower substrates different from each other by an angle θ, and they are bonded together with a thermosetting resin.

Then, two compounds represented by the following formulas (A) and (B) were mixed in a mixing ratio of 8:2 [(A):(B)=8:2] by weight to give a smectic liquid crystal material.

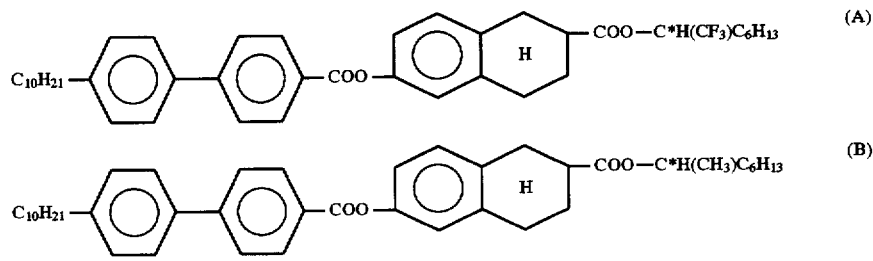

The texture of the liquid crystal material was observed by a polarization microscope. As a result, it was confirmed that this liquid crystal material was in a $SmC_A$ phase at room temperature or thereabout.

Subsequently, the liquid crystal material was poured at 140° C. into the liquid crystal cell 5 shown in FIG. 1 and having the cross angle θ represented by the aforesaid formula [I] of 176°, followed by slow cooling. The liquid crystal cell 5 was placed between polarizing plates of the crossed Nicols arrangement equipped in a polarization microscope in such a manner that the darkest state was obtained when observed by the polarization microscope in the transmission mode. A halogen lamp was Used as the light source. The minimum value T of the light transmittance, which is represented by the aforesaid formula [IV], was measured by a photomultiplier equipped on a lens barrel of the polarization microscope. As a result, the minimum value T of the light transmittance of the cell was 0.5%. Further, the cell was observed by the polarization microscope, and it was confirmed that the extinction positions were almost the same as each other all over the surface of the cell and the layer normal directions were almost parallel with each other all over the surface of the cell.

However, when a rectangular wave of ±15 V/2 μm having a frequency of 100 Hz and DUTY of 50%, that is an electric field enough for the above liquid crystal cell to respond eletrooptically, was applied to the cell, stripe defects parallel with the rubbing direction took place. Therefore, the minimum value T' of the light transmittance became 1.5% in the ferroelectric state, and the minimum value T" of the light transmittance became 1.2% in the antiferroelectric state after application of the electric field was stopped. Accordingly, no satisfactory contrast was obtained.

Then, a pulse wave of ±40 V/2 μm having a frequency of 100 Hz and DUTY of 50% was applied to the above liquid crystal cell for 5 minutes at room temperature, followed by lowering the intensity of the electric field to ±15 V/2 μm. As a result, the stripe defects were prominently reduced, and the minimum value T' became 0.3% in the ferroelectric state. Further, the minimum value T" became 0.2% in the antiferroelectric state after application of the electric field was stopped. Accordingly, a contrast better than that in the initial stage was obtained.

Example 2

The above liquid material used in Example 1 was poured at 140° C. into a liquid crystal cell prepared in the same manner as described in Example 1, and the composition was slowly cooled to room temperature with applying a pulse wave of ±40 V/2 μm having a frequency of 100 Hz and DUTY of 50% to the cell. Then, the intensity of the electric field was lowered to ±15 V/2 μm. As a result, the minimum value T' became 0.3% in the ferroelectric state, and the minimum value T" became 0.2% in the antiferroelectric state after application of the electric field was stopped.

Example 3

Slow cooling of the liquid crystal composition was carried out in the same manner as described in Example 2 except that a direct current field of ±40 V/2 μm was used as the electric field applied to the cell. As a result, the minimum value T' became 0.4% in the ferroelectric state when the electric field of ±15 V/2 μm was applied, and the minimum value T" became 0.2% in the antiferroelectric state after application of the electric field was stopped.

Example 4

Slow cooling of the liquid crystal composition was carried out in the same manner as described in Example 2 except that the application of the electric field was initiated at 75° C. which was just above the AC transition point. As a result, the minimum value T' became 0.4% in the ferroelectric state when the electric field of ±15 V/2 μm was applied, and the minimum value T" became 0.3% in the antiferroelectric state after application of the electric field was stopped.

Comparative Example 1

The procedure of Example 1 was repeated except that the electric field applied to the cell was varied to ±17 V/2 μm. As a result, the minimum value T' became 1.5% in the ferroelectric state when the electric field of ±15 V/2 μm was applied, and the minimum value T" became 1.0% in the antiferroelectric state after application of the electric field was stopped. Accordingly, no satisfactory contrast was obtained. Also in the case of applying an electric field of ±17 V/2 μm for 30 minutes, almost the same results were obtained.

Comparative Example 2

The procedure of Example 2 was repeated except that the electric field applied to the cell was varied to ±12 V/2 µm. As a result, the minimum value T' became 1.5% in the ferroelectric state when the electric field of ±15 V/2 µm was applied, and the minimum value T" became 1.0% in the antiferroelectric state after application of the electric field was stopped. Accordingly, darkness of insufficient level was only obtained.

Comparative Example 3

The procedure of Example 2 was repeated except that the angle θ represented by the aforesaid formula [II] was varied to 184°, to prepare a liquid crystal device. The minimum value T of this liquid crystal device was 1.2%. When the liquid crystal material inside the liquid crystal cell of the liquid crystal device was observed by a polarization microscope, occurrence of stripe defect in the domain was not observed. However, the extinction positions were different with adjacent domains. Accordingly, no satisfactory darkness was obtained.

According to the invention, as is evident from the results of Example 1 to Example 4, satisfactory darkness was obtained in both the ferroelectric state and the antiferroelectric state not only in the initial stage but also after conducting the application of electric field.

Example 5

[Process 2 for preparing cell]

On each of two soda-lime glass substrates having been abraded on the surface, a $SiO_2$ thin film of 500 Å in thickness and an ITO transparent electrode of 800 Å in thickness were formed in this order, and thereto was applied commercially available polyimide (Optomer AL1254) by means of spin coating in such a manner that the resulting polyimide film would have a thickness of 300 Å, followed by heating at 180° C.

Then, the surface of the polyimide film on each substrate was rubbed in a given direction with nylon cloth.

The thus rubbed polyimide film (orientation film) on one substrate was coated with an ethanol suspension of spherical silica spacer having a mean particle diameter of 2.0 µm by means of spin coating, and the substrate with the coated layer was heated at 110° C. for 1 hour to evaporate ethanol so as to make the spherical silica in the scattered state on the orientation film.

This substrate with the orientation film having scattered spacers and the other substrate with the orientation film having no spacer were placed one upon another in such a manner that the orientation films would face each other, and they are bonded together with a thermosetting resin.

[Process 3 for preparing cell]

A liquid crystal cell was prepared in the same manner as described in the above process 2 except that two of the substrates each provided with an orientation film having been subjected to rubbing were bonded together in such a manner that the rubbing directions of the two orientation films would intersect at an angle θ.

[Process 1 for preparing liquid crystal device]

A liquid crystal compound of the following structure was poured at 160° C. into the cell prepared by the above process 2.

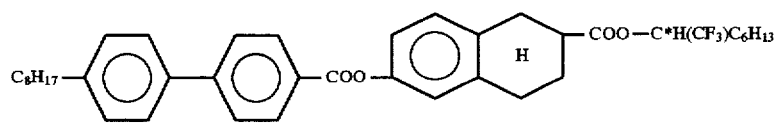

Then, the cell was placed between two polarizing plates of the crossed Nicols arrangement equipped in a polarization microscope, and the cell was observed by the polarizing microscope with slow cooling. As a result, in any of the smectic A phase and the smectic $C_A$ phase, the extinction positions were different by at most 9° with domains on the same plane. From this fact, it was ascertained that the angle of the layer normal against the rubbing direction was not univocally decided in the liquid crystal compound of the above structure.

[Process 2 for preparing liquid crystal device]

The liquid crystal compound used in the above process 1 for preparing a liquid crystal device was poured as the liquid crystal material at 160° C. into the cell prepared by the above process 3 (the cross angle θ represented by the aforesaid formula [I]: 170° ), and the compound was slowly cooled.

The cell was placed between two polarization plates of the crossed Nicols arrangement equipped in a polarization microscope in such a manner that the darkest state was obtained when the liquid crystal compound in the cell was observed by the polarization microscope. In the observation by the polarization microscope, a halogen lamp was used as the light source. When the minimum value T of the light transmittance was evaluated in accordance with the aforesaid formula [IV] using the minimum amount I of the transmitted light, i.e., the amount of the transmitted light in the darkness state, it was 0.1%. Further, the liquid crystal material inside the cell was observed by the polarization microscope. As a result, it was confirmed that the extinction positions were almost the same as each other all over the surface of the cell and the layer normal directions were almost parallel with each other all over the surface of the cell.

Comparative Example 4

A liquid crystal device was prepared in the same manner as described in Example 5 except that the cross angle θ represented by the aforesaid formula [I] was set to 10°.

When the minimum value T of the light transmittance was evaluated in the same manner as described in Example 5, it was 1.6%. Further, the liquid crystal material inside the cell was observed by a polarization microscope. As a result, it was confirmed that the extinction positions were entirely different with adjacent domains and the layer normal directions were different with places in the cell.

Example 6

A cell was prepared in accordance with the process 3 for preparing a cell in Example 5 while setting the cross angle θ represented by the aforesaid formula [I] to 150°. Into the cell was poured a liquid crystal compound of the following formula, and the compound was slowly cooled in the same manner as described in Example 5.

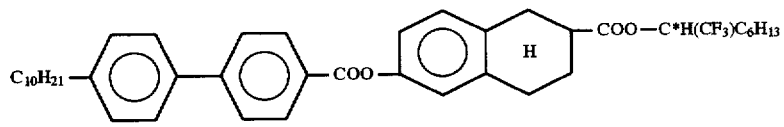

Using the liquid crystal cell and two polarizing plate, a liquid crystal device similar to that in Example 5 was prepared.

When the minimum value T of the light transmittance of the liquid crystal device was evaluated in the same manner as described in Example 5, it was 0.3%.

Comparative Example 5

A liquid crystal device was prepared in the same manner as described in Example 6 except that the cross angle θ represented by the aforesaid formula [I]was varied to 10°.

When the minimum value T of the light transmittance of the liquid crystal device was evaluated in the same manner as described in Example 5, it was 1.2%. Further, the liquid crystal material inside the cell was observed by a polarization microscope. As a result, it was confirmed that the extinction positions were entirely different with adjacent domains and the layer normal directions were different with places in the cell.

Example 7

A cell was prepared in accordance with the process 3 for preparing a cell in Example 5 while setting the cross angle θ represented by the aforesaid formula [I] to 170°. Into the cell was poured a liquid crystal compound of the following formula, and the compound was slowly cooled in the same manner as described in Example 5.

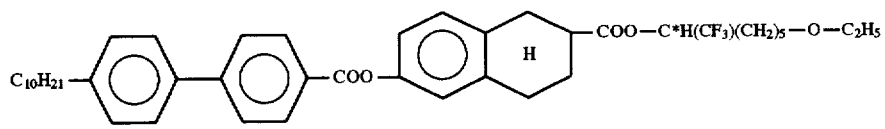

Using the liquid crystal cell and two polarizing plates, a liquid crystal device similar to that in Example 5 was prepared.

When the minimum value T of the light transmittance of the liquid crystal device was evaluated in the same manner as described in Example 5, it was 0.2%.

Example 8

A cell was prepared in accordance with the process 3 for preparing a cell in Example 5 while setting the cross angle θ represented by the aforesaid formula [I] to 170°. Into the cell was poured a liquid crystal compound of the following formula, and the compound was slowly cooled in the same manner as described in Example 5.

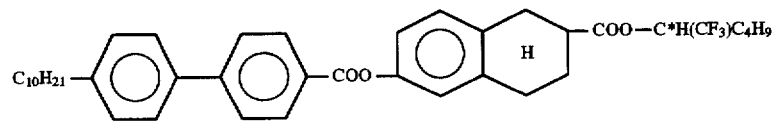

Using the liquid crystal cell and two polarizing plates, a liquid crystal device similar to that in Example 5 was prepared.

When the minimum value T of the light transmittance of the liquid crystal device was evaluated in the same manner as described in Example 5, it was 0.3%.

Example 9

A cell was prepared in accordance with the process 3 for preparing a cell in Example 5 while setting the cross angle θ represented by the aforesaid formula [I] to 110°. Into the cell was poured a liquid crystal compound of the following formula, and the compound was slowly cooled in the same manner as described in Example 5.

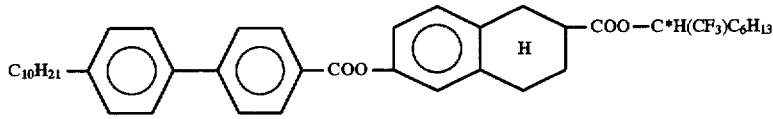

Using the liquid crystal cell and two polarizing plates, a liquid crystal device similar to that in Example 5 was prepared.

When the minimum value T of the light transmittance of the liquid crystal device was evaluated in the same manner as described in Example 5, it was 0.3%.

Comparative Example 6

A liquid crystal device was prepared in the same manner as described in Example 9 except that the cross angle θ represented by the aforesaid formula [I] was varied to 10°.

When the minimum value T of the light transmittance of the liquid crystal device was evaluated in the same manner as described in Example 9, it was 1.2%.

What is claimed is:

1. A liquid crystal device comprising a liquid crystal cell filled with a liquid crystal material capable of exhibiting a smectic phase, said cell including upper and lower substrates each having in order an electrode and an orientation film in contact with the liquid crystal material, the surface of each orientation film is treated by subjecting the film to an orientation treatment to control an orientation direction of the liquid crystal material with which it is in contact, wherein the orientation treatment direction of one orientation film is different from the orientation treatment direction of the other orientation film, and a cross angle Θ formed by the orientation treatment directions of the orientation films, as measured in the clockwise direction based on the orientation treatment direction of the orientation film of the upper substrate side, is represented by the following formula (I) or (II):

$$\Theta = 180° - \delta \quad (I)$$
$$\Theta = 360° - \delta \quad (II)$$

wherein $0° < \delta \leq 90°$, and wherein when the liquid crystal cell filled with the liquid crystal material in a smectic phase is placed between two polarizing plates of the crossed Nicols arrangement in such a manner that the amount of the transmitted light, which transmits through one polarizing plate, the liquid crystal cell and the other polarizing plate in this order, would be minimum, the minimum value T of the light transmittance represented by the following formula (IV) is not more than 1.0%;

$$T = ((I - I_0)/I_{100}) \times 100 \quad (IV)$$

wherein I is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

2. A liquid crystal device comprising a liquid crystal cell filled with a liquid crystal material capable of exhibiting a smectic phase, said cell including upper and lower substrates each having in order an electrode and an orientation film in contact with the liquid crystal material, the surface of each orientation film is treated by subjecting the film to an orientation treatment to control an orientation direction of the liquid crystal material with which it is in contact, wherein the orientation treatment direction of one orientation film is different from the orientation treatment direction of the other orientation film, and a cross angle Θ formed by the orientation treatment directions of the orientation films, as measured in the clockwise direction based on the orientation treatment direction of the orientation film of the upper substrate side, is represented by the following formula (I) or (II):

$$\Theta = 180° - \delta \quad (I)$$
$$\Theta = 360° - \delta \quad (II)$$

wherein $0° < \delta \leq 90°$, and wherein when the liquid crystal cell filled with the liquid crystal material in a smectic phase is placed between two polarizing plates of the crossed Nicols arrangement in such a manner that the amount of the transmitted light, which transmits through one polarizing plate, the liquid crystal cell and the other polarizing plate in this order with applying electric voltage between the electrodes of the liquid crystal cell to vary the optical axis of the cell, would be minimum, the minimum value T' of the light transmittance represented by the following formula (V) is not more than 1.0%;

$$T' = ((I' - I_0)/I_{100}) \times 100 \quad (V)$$

wherein I' is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

3. A liquid crystal device comprising a liquid crystal cell filled with a liquid crystal material capable of exhibiting a smectic phase, said cell including upper and lower substrates each having in order an electrode and an orientation film in contact with the liquid crystal material, the surface of each orientation film is treated by subjecting the film to an orientation treatment to control an orientation direction of the liquid crystal material with which it is in contact, wherein the orientation treatment direction of one orientation film is different from the orientation treatment direction of the other orientation film, and a cross angle Θ formed by the orientation treatment directions of the orientation films, as measured in the clockwise direction based on the orientation treatment direction of the orientation film of the upper substrate side, is represented by the following formula (I) or (II):

$$\Theta = 180° - \delta \quad (I)$$

$$\Theta=360°-\delta \quad \text{(II)}$$

wherein $0°<\delta\leq 90°$, and wherein when the liquid crystal cell filled with the liquid crystal material in a smectic phase is placed between two polarizing plates of the crossed Nicols arrangement in such a manner that the amount of the transmitted light, which transmits through one polarizing plate, the liquid crystal cell and the other polarizing plate in this order after alternating voltage is applied between the electrodes of the liquid crystal cell to drive the cell and application of the voltage is stopped, would be minimum, the minimum value T" of the light transmittance represented by the following formula (VI) is not more than 1.0%;

$$T''=((I''-I_0)/I_{100})\times 100 \quad \text{(VI)}$$

wherein I" is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

4. A process for preparing a liquid crystal device having a liquid crystal cell filled with a liquid crystal material capable of being in a smectic phase, said cell including upper and lower substrates each having in order an electrode and an orientation film in contact with the liquid crystal material, which comprises a step of treating the surface of each orientation film by subjecting the film to an orientation treatment to control an orientation direction of the liquid crystal material with which it is in contact in the cell, said orientation treatment being conducted in such a manner that the angle formed by the orientation treatment direction of one orientation film and the orientation treatment direction of the other orientation film, as measured in the clockwise direction based on the orientation treatment direction of the orientation film of the upper substrate side, would be an angle $\Theta$ represented by the following formula (I) or (II):

$$\Theta=180°-\delta \quad \text{(I)}$$

$$\Theta=360°-\delta \quad \text{(II)}$$

wherein $0°<\delta\leq 90°$, and wherein when the liquid crystal cell filled with the liquid crystal material in a smectic phase is placed between two polarizing plates of the crossed Nicols arrangement in such a manner that the amount of the transmitted light, which transmits through one polarizing plate, the liquid crystal cell and the other polarizing plate in this order, would be minimum, the minimum value T of the light transmittance represented by the following formula (IV) is not more than 1.0%;

$$T=((I-I_0)/I_{100})\times 100 \quad \text{(IV)}$$

wherein I is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

5. A process for preparing a liquid crystal device having a liquid crystal cell filled with a liquid crystal material capable of being in a smectic phase, said cell including upper and lower substrates each having in order an electrode and an orientation film in contact with the liquid crystal material, which comprises a step of treating the surface of each orientation film by subjecting the film to an orientation treatment to control an orientation direction of the liquid crystal material with which it is in contact in the cell, said orientation treatment being conducted in such a manner that the angle formed by the orientation treatment direction of one orientation film and the orientation treatment direction of the other orientation film, as measured in the clockwise direction based on the orientation treatment direction of the orientation film of the upper substrate side, would be an angle $\Theta$ represented by the following formula (I) or (II):

$$\Theta=180°-\delta \quad \text{(I)}$$

$$\Theta=360°-\delta \quad \text{(II)}$$

wherein $0°<\delta\leq 90°$, and wherein when the liquid crystal cell filled with the liquid crystal material in a smectic phase is placed between two polarizing plates of the crossed Nicols arrangement in such a manner that the amount of the transmitted light, which transmits through one polarizing plate, the liquid crystal cell and the other polarizing plate in this order with applying electric voltage between the electrodes of the liquid crystal cell to vary the optical axis of the cell, would be minimum, the minimum value T' of the light transmittance represented by the following formula (V) is not more than 1.0%;

$$T'=((I'-I_0)/I_{100})\times 100 \quad \text{(V)}$$

wherein I' is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

6. A process for preparing a liquid crystal device having a liquid crystal cell filled with a liquid crystal material capable of being in a smectic phase, said cell including upper and lower substrates each having in order an electrode and an orientation film in contact with the liquid crystal material, which comprises a step of treating the surface of each orientation film by subjecting the film to an orientation treatment to control an orientation direction of the liquid crystal material with which it is in contact in the cell, said orientation treatment being conducted in such a manner that the angle formed by the orientation treatment direction of one orientation film and the orientation treatment direction of the other orientation film, as measured in the clockwise direction based on the orientation treatment direction of the orientation film of the upper substrate side, would be an angle $\Theta$ represented by the following formula (I) or (II):

$$\Theta=180°-\delta \quad \text{(I)}$$

$$\Theta=360°-\delta \quad \text{(II)}$$

wherein $0°<\delta\leq 90°$, and wherein when the liquid crystal cell filled with the liquid crystal material in a smectic phase is placed between two polarizing plates of the crossed Nicols arrangement in such a manner that the amount of the transmitted light, which transmits through one polarizing plate, the liquid crystal cell and the other polarizing plate in this order after alternating voltage is applied between the electrodes of the liquid crystal cell to drive the cell and application of the voltage is stopped, would be minimum, the minimum value T" of the light transmittance represented by the following formula (VI) is not more than 1.0%;

$$T''=((I''-I_0)/I_{100})\times 100 \qquad (VI)$$

wherein I" is the minimum amount of the transmitted light, $I_0$ is an amount of the transmitted light in the crossed Nicols arrangement when the liquid crystal cell is not placed, and $I_{100}$ is a difference between $I_0$ and the amount of the transmitted light in the parallel Nicols arrangement when the liquid crystal cell is not placed.

* * * * *